United States Patent Office 3,686,154
Patented Aug. 22, 1972

3,686,154
COMPOSITION AND PROCESS FOR PREPARING CROSS-LINKED FLUORO-POLYMER PRODUCTS
Ausat Ali Khan, Newark, Del., assignor to E. I. du Pont de Nemours and Company, Wilmington, Del.
No Drawing. Filed Mar. 29, 1971, Ser. No. 129,179
Int. Cl. C08f 15/02, 27/08
U.S. Cl. 260—87.5 A
10 Claims

ABSTRACT OF THE DISCLOSURE

A curable fluoropolymer composition which will undergo cross-linking when heated can be made by mixing a copolymer of tetrafluoroethylene and a perfluoroalkyl perfluorovinyl ether with a polyfunctional tertiary amine. The composition can be used to make cured or cross-linked chemical and heat-resistant fluoropolymer products having an unusual combination of properties including insolubility in solvents for the uncured copolymer, and the ability to be molded or remolded under heat and pressure after the cross-linking operation.

BACKGROUND OF THE INVENTION

This invention relates to fluoropolymer compositions which contain a copolymer of tetrafluoroethylene and a perfluoroalkyl perfluorovinyl ether, and which can be molded under heat and pressure to form products having good chemical resistance and heat resistance. The invention also concerns a process for curing such compositions and the resulting products.

There is a need in the art for a fluoropolymer composition made from a copolymer of the type mentioned above which can be cured in a practical manner to form cross-linked polymeric products having (a) good chemical resistance including insolubility at ordinary ambient temperatures in solvents which dissolve the uncured copolymer and (b) good resistance to degradation when exposed to high temperatures (e.g. 250–350° C.). There is also a need for such a composition which has sufficient thermoplastic properties after the curing operation so that it can be molded, remolded, postformed, or otherwise made into shaped articles with the aid of heat and pressure.

SUMMARY OF THE INVENTION

Expressed broadly, the present invention provides a fluoropolymer composition comprised of a mixture of (A) a copolymer of tetrafluoroethylene and perfluoroalkyl perfluorovinyl ether, said ether having the formula $C_nF_{2n+1}$—O—CF=CF$_2$ wherein $n$ is a number of 1–5, and (B) a compound selected from the group: polyfunctional tertiary amines and precursors thereof capable of forming such amines in situ, component B being present in an amount equal to about 1–10% by weight of component A.

The invention also provides a composition obtained by heating the composition described in the previous paragraph at a temperature of about 100–350° C. until the copolymer has undergone cross-linking.

In addition, there is provided a process for preparing a cross-linked fluoropolymer which comprises
(1) Providing a mixture of a copolymer of tetrafluoroethylene and perfluoroalkyl perfluorovinyl ether, said ether having the formula $C_nF_{2n+1}$—O—CF=CF$_2$ wherein $n$ is a number of 1–5, and a compound selected from the group: polyfunctional tertiary amines and precursors thereof capable of forming such amines in situ, said compound being present in an amount equal to about 1–10% by weight of the copolymer, and
(2) Heating the resulting mixture at a temperature of about 100–350° C. until the copolymer has undergone the desired amount of cross-linking.

DESCRIPTION OF PREFERRED EMBODIMENTS

In many cases, it is preferred that the novel curable composition contains a component A copolymer wherein said ether is perfluoromethyl perfluorovinyl ether. Useful results can also be obtained when the perfluoromethyl group of the ether is replaced with a $C_2$–$C_5$ perfluoroalkyl group. It is also preferred in many applications of the invention to use a component A copolymer which is an elastomer having a tetrafluoroethylene/ether molar ratio of about 50:50 to 70:30. The composition tends to become less elastomeric as the ether content is reduced.

The component A type of copolymer is known in the art. For example, polymers of this type and methods of preparing them are described in U.S. Pat. 3,132,123 issued May 5, 1964 to Harris and McCane, and in Canadian Pat. 894,898, issued Mar. 7, 1972 to G. A. Gallagher (priority date of Feb. 18, 1970). The copolymer is a solid (non-liquid) under normal atmospheric conditions. The copolymer is preferably prepared by a free-radical polymerization in aqueous emulsion whereby the monomer units are randomly connected to each other to form chains of recurring monomer units.

The curable mixture of components A and B preferably contains about 2–5% of component B based on the weight of component A.

An especially preferred component B compound is triethylenediamine. Another very useful compound is N,N'-bis-(3-aminopropyl)piperazine. Other useful component B compounds are illustrated as follows: salts of triethylenediamine (e.g. the sulfates, chlorides, and borates) which are capable of forming the tertiary amine in situ during heating of the composition; tris(dodecyl methylene)diamine; 3-(1,5-diazobicyclo)(3,2,1)-oct-8-yl indole; 4,4'-methylene-bis-(N,N'-dimethyl aniline); 2,3-bis-(2-pyridyl)-5,6-dihydropyrazine; 4,4'-trimethylene dipyridine; 4,4' - trimethylene bis - (N - piperidine ethanol); N,N'-bis-(R) piperazines wherein R is a $C_1$–$C_6$ alkyl group or a substituted analog thereof (e.g. containing an amino, halide, or hydroxy substituent); and Troegers base, which is also known as 2,8 dimethyl 6H, 12H-5,11 methanodibenzo[b,f][1,5]diazocine.

In preparing the cross-linked polymeric product by the process of this invention, it is often preferred to subject the curable mixture to sufficient pressure in a molding means during at least a portion of the step 2 heating operation so that a cross-linked article of predetermined shape is obtained. The molding means can be any suitable apparatus known to be useful for the manufacture of molded articles or sheet materials from polymeric materials capable of flowing under heat and pressure.

It is a preferred embodiment of the present process to heat the curable composition in step 2 until the copolymer has become sufficiently cross-linked so that it is substantially insoluble at ordinary ambient temperatures (e.g. up to about 130° C.) in a liquid organic solvent which will dissolve the copolymer used in step 1.

It is also preferred to heat the composition until is has undergone the desired increase in stress/strain and flow resistance properties as measured at ordinary ambient temperatures. These embodiments are illustrated in the examples that follow.

The curable composition can contain one or more additives such as those known to be useful in fluoropolymer molding compositions, for example, pigments, fillers, other fluoropolymers, pore-forming agents, plasticizers such as certain fluorocarbon oils, and divalent metal oxides and hydroxides.

Fluoropolymer compositions are obtainable according to the present invention which are beneficially useful in many applications; for example: (a) where a cured fluoropolymer product is desired which has not only useful stress/strain and flow resistance properties at ordinary temperatures, but also excellent chemical resistance, including insolubility in solvents for the uncured material, at least at ordinary ambient temperatures; (b) where a cured fluoropolymer product having thermoplastic properties at elevated temperatures is desired so that the configuration of the product can be changed by known heating or hot pressing operations such as molding, remolding, postforming, and the like; (c) where it is desired to convert an uncured fluoropolymer material to a cured chemical-resistant product in a simple molding and heating operation; (d) where an elastomer product is desired which retains useful strength and other physical properties after extended aging at a very high temperature followed by cooling to ordinary ambient temperatures; and (e) where combinations of two or more such characteristics are desired.

The invention makes it possible to manufacture molded fluoroelastomer articles from the copolymer described above which have satisfactory solvent resistance, tensile strength, heat resistance, and other properties for many applications where it was previously necessary to use other fluoroelastomers (such as certain terpolymers) which are not as easy and economical to prepare as the present copolymer.

The cured compositions and the uncured compositions provided by this invention are useful articles of commerce which can be supplied to manufacturers of final products and intermediate products in the general field of producing fluoropolymer articles.

Example 1

This example and those that follow illustrate the invention; amounts are by weight unless otherwise indicated.

A fluoropolymer composition which can be cured by cross-linking at an elevated temperature is prepared by mixing the following ingredients on a two-roll rubber mill whose rolls are at about 15.6° C.: 75 parts of fluoropolymer, 10 parts of type SAF carbon black, 2 parts of magnesium oxide, and 3 parts of triethylenediamine. The fluoropolymer is an elastomeric copolymer of 61 mole percent of tetrafluoroethylene and 39 mole percent of perfluoromethyl perfluorovinyl ether.

The resulting fluoroelastomer composition has the beneficial utility described in the 3 paragraphs just before Example 1.

Samples of the composition are molded, cured, and tested as described below. The test results are shown in Table I.

TABLE I

| Test Number | 1.1 | 1.2 | 2.1 | 2.2 | 4.1 | 4.2 | 5.1 |
|---|---|---|---|---|---|---|---|
| Modulus-100%, p.s.i | 600 | 600 | 1,050 | 900 | 1,450 | 850 | 2,250 |
| Tensile strength, p.s.i | 2,250 | 1,640 | 1,750 | 2,250 | 2,400 | 800 | 2,250 |
| Elongation at break, percent | 310 | 350 | 190 | 230 | 180 | 450 | 120 |
| Set at break, percent | 15 | 20 | 6 | 8 | 9 | 42 | 12 |

The samples for Test 1.1 are compression molded for 30 minutes at 180° C. and post-cured in an oven in which a blower circulates the air. During post-curing, the molded samples are heated as follows: 24 hours at 149° C., 24 hours at 177° C., 24 hours at 204° C., 6 hours while the temperature rises to 300° C., then for 24 hours at 300° C. A simpler curing cycle is shown below in Examples 3–5.

The modulus, tensile, elongation, and set values in Table I are obtained at room temperature by ASTM Method D–412–66.

The samples for Test 1.2 are prepared by repeating the Test 1.1 molding and post-curing procedure, followed by heat aging the samples for seven days at 288° C. in the post-curing oven. It can be seen from Test 1.2 of Table I that the elastomer product retains very useful strength and other physical properties after prolonged aging at 288° C., which is quite severe exposure for an elastomer.

When samples of the uncured elastomer composition as removed from the two-roll mill are tested for solvent resistance by leaving them immersed for seven days at 24° C. in a solvent composed of 99% 2,3-dichlorooctafluorobutane and 1% diglyme (diethylene glycol dimethyl ether), the elastomer is found to be completely soluble in the solvent. In fact, the uncured elastomer dissolves within 24 hours. But when samples of composition are molded and cured as described for Test 1.1 and tested for solvent resistance in the same manner, the elastomer is found to be insoluble in the solvent. The uncured composition also does not have useful stress/strain and flow resistance properties; but it is apparent from Table I that the cured material does.

Example 2

Cured elastomer samples for the Test 2.1 shown in Table I are prepared and tested in the manner described above for Test 1.1 except the ingredients mixed on the rubber mill are as follows: 100 parts of the fluoropolymer, 14 parts of SAF carbon black, 2 parts of magnesium oxide, and 4 parts of triethylenediamine. As in Example 1, the elastomer of the cured samples is not soluble in the solvent.

Some of the molded samples as prepared for Test 2.1 are subjected to a remolding operation by cutting the samples into pieces about ¼ inch square, placing a quantity of the pieces between two sheets of polytetrafluoroethylene in a hydraulic press, and molding the pieces into a ⅛ inch thick sheet by using a molding time/temperature/pressure of 30 minutes/204° C./10,000 pounds total pressure. The remolded samples are tested in the manner described for Test 1.1, and the results are reported in Table I as Test 2.2. The composition has surprisingly good remolding properties considering that it has been cross-linked and rendered insoluble; and its Table I physical properties are unexpectedly good for a remolded fluoroelastomer. The product has a set at break value of 5% when the remolded samples are tested at 121° C.

Example 3

Another useful composition is prepared in the manner described in Example 2 except (a) the triethylenediamine is replaced with 5 parts of tris(dodecyl methylene) diamine. Samples of the composition are molded for 30 minutes at 180° C. and post-cured in an oven filled with nitrogen while the temperature rises to 204° C. during a period of 4 hours and then remains at 204° C. for 24 hours.

The elastomer of the uncured composition is soluble in a solvent composed of 95 parts of the Example 1 fluorocarbon solvent and 5 parts of ethanol; but the solvent does not dissolve the elastomer of the cured samples. The cured samples are easily remolded in the manner described in Example 2.

Example 4

A useful fluoroelastomer composition is prepared in the manner described in Example 2 except the triethylenediamine is replaced with 3 parts of N,N'-bis-(3 aminopropyl) piperazine. Samples of the composition are molded for 30 minutes at 180° C. and post-cured in an oven while the temperature rises to 232° C. during a period of 4 hours and then remains at 232° C. for 24 hours.

The resulting cured samples are tested as described for Test 1.1, and the results are reported as 4.1 in Table I. Even after the cured samples are subjected to a severe heat exposure cycle of 65 hours at 316° C. in a nitrogen-filled oven, followed by cooling to 24° C., they still have physical properties which are useful in many applications as shown by Test 4.2 in Table I.

Example 5

Example 4 is repeated except the 3 parts of N,N'-bis-(3-aminopropyl)piperazine are replaced with 4 parts of the same compound, and the post-curing temperature is 204° C. instead of 232° C. The test results are reported as Test 5.1 in Table I. The elastomer of the cured samples is insoluble in the solvent used in Example 3 after immersion therein for seven days at 24° C.

I claim:
1. A fluoropolymer composition comprised of a mixture of
    (A) a copolymer of tetrafluoroethylene and a perfluoroalkyl perfluorovinyl ether, said ether having the formula $C_nF_{2n+1}$—O—CF=CF$_2$ wherein $n$ is a number of 1–5, and
    (B) a compound selected from the group: polyfunctional tertiary amines and precursors thereof capable of forming such amines in situ, component B being present in an amount equal to about 1–10% by weight of component A.
2. A composition obtained by heating the composition of claim 1 at a temperature of about 100–350° C. until the copolymer has undergone cross-linking.
3. A composition according to claim 1 which contains about 2–5% of component B based on the weight of component A.
4. A composition according to claim 3 wherein said ether of component A is perfluoromethyl perfluorovinyl ether.
5. A composition according to claim 3 wherein component A is an elastomer having a tetrafluoroethylene/ether molar ratio of about 50:50 to 70:30.
6. A composition according to claim 3 wherein component B is triethylenediamine.
7. A composition according to claim 3 wherein component B is N,N'-bis-(3 aminopropyl)piperazine.
8. A process for preparing a cross-linked fluoropolymer which comprises
    (1) providing a mixture of a copolymer of tetrafluoroethylene and a perfluoroalkyl prefluorovinyl ether, said ether having the formula
    $$C_nF_{2n+1}—O—CF=CF_2$$
    wherein $n$ is a number of 1–5, and a compound selected from the group: polyfunctional tertiary amines and precursors thereof capable of forming such amines in situ, said compound being present in an amount equal to about 1–10% by weight of the copolymer, and
    (2) heating the resulting mixture at a temperature of about 100–350° C. until the copolymer has undergone the desired amount of cross-linking.
9. A process according to claim 8 wherein the mixture is subjected to sufficient pressure in a molding means during at least a portion of step (2) so that a cross-linked article of predetermined shape is obtained.
10. A process according to claim 8 wherein the mixture is heated in step (2) until the copolymer has become sufficiently cross-linked so that it is substantially insoluble at ordinary ambient temperature in a liquid organic solvent which will dissolve the copolymer used in step (1).

References Cited
UNITED STATES PATENTS

| | | | |
|---|---|---|---|
| 2,793,202 | 5/1957 | West | 260—87.5 A |
| 2,979,490 | 4/1961 | West | 260—87.5 A |
| 3,132,123 | 5/1964 | Harris et al. | 260—87.5 A |

JOSEPH L. SCHOFER, Primary Examiner

J. A. DONAHUE, JR., Assistant Examiner